United States Patent

Hasegawa

[19]

[11] Patent Number: 6,124,047

[45] Date of Patent: Sep. 26, 2000

[54] SOFT MAGNETIC FILM AND A MAGNETIC HEAD OF AN MR/INDUCTIVE COMPOSITE TYPE USING SUCH A SOFT MAGNETIC FILM

[75] Inventor: Naoya Hasegawa, Niigata-ken, Japan

[73] Assignee: Alps Electric Co., Ltd., Tokyo, Japan

[21] Appl. No.: 09/124,676

[22] Filed: Jul. 29, 1998

[30] Foreign Application Priority Data

Jul. 29, 1997 [JP] Japan ..................... 9-202774

[51] Int. Cl.[7] .................................................. G11B 5/66

[52] U.S. Cl. ............. 428/692; 428/694 R; 428/694 T; 428/900; 420/435; 360/113; 148/305; 148/313

[58] Field of Search ........................ 428/694 T, 694 R, 428/900, 692; 148/305, 313; 420/435; 360/113

[56] References Cited

U.S. PATENT DOCUMENTS

| 5,164,025 | 11/1992 | Hasegawa | 148/313 |
|---|---|---|---|
| 5,264,980 | 11/1993 | Mowry et al. | 360/113 |
| 5,522,946 | 6/1996 | Tomita | 148/304 |
| 5,750,273 | 5/1998 | Inoue | 428/692 |
| 5,895,727 | 4/1999 | Hasegawa | 428/692 |
| 5,962,153 | 10/1999 | Kirino | 428/692 |

*Primary Examiner*—Leszek Kiliman
*Attorney, Agent, or Firm*—Brinks Hofer Gilson & Lione

[57] ABSTRACT

A soft magnetic film comprises a Co—M—T—C alloy wherein a film structure is predominantly made of an amorphous phase and element M and C are chemically combined. The use of this film as a lower core layer in an MR/inductive composite-type thin film magnetic head ensures high saturation magnetic flux density, high resistivity, low magnetostriction constant and appropriate magnetic field, and leads to improvements in core and shield functions of the lower core layer.

28 Claims, 2 Drawing Sheets

SOFT MAGNETIC FILM AND A MAGNETIC HEAD OF AN MR/INDUCTIVE COMPOSITE TYPE USING SUCH A SOFT MAGNETIC FILM

BACKGROUND OF THE INVENTION

1. Field of the Invention

This invention relates to a soft magnetic film which is used, for example, as a lower core layer (upper shield layer) of a thin-film magnetic head of the magnetoresistive(MR)/inductive type, and more particularly, to a soft magnetic film having high resistivity while keeping a high saturation magnetic flux density and also to a thin-film magnetic head of the MR/inductive composite type.

2. Description of the Relates Art

FIG. 3 is an enlarged sectional view showing a conventional thin film magnetic head as viewed from a side facing to a recording medium.

This thin film magnetic head is a so-called MR/inductive composite-type thin film magnetic wherein a read head h1 utilizing a magnetoresistive effect and a write inductive head h2 are built up, as shown, at an end face of a trailing side of a slider constituting, for example, a floating head.

The read head h1 includes a lower shield layer 1 formed of sendust or an Ni—Fe alloy (permalloy), and a lower gap layer 2 formed on the layer 1 and made of a non-magnetic material such as $Al_2O_3$ (aluminium oxide), on which a magnetoresistive layer 3 is further formed. The magnetoresistive layer 3 is constituted of three layers including, as viewed from the bottom, a soft adjacent layer (SAL), a non-magnetic layer (shunt layer) and a magnetoresistive layer (MR layer) arranged in this order. The magnetoresistive layer is normally a layer made of a Ni—Fe alloy (permalloy), the shunt layer is a layer made of Ta (tantalum), and the soft magnetic layer is made of a Ni—Fe—Nb alloy.

The magnetoresistive layer 3 has, at opposite sides thereof, a hard bias layer as a longitudinal bias layer. Moreover, an electrode layer 5 made of a non-magnetic conductive material with a small electric resistance, e.g. Cu (copper), W (tungsten) or the like, is formed on the hard bias layer 4. An upper gap layer 6 made of a non-magnetic material, such as aluminium oxide, is further formed as shown.

A lower core layer 20 is formed on the upper gap layer 6 by plating such as of permalloy. In the inductive head h2, this lower core layer 20 function as a leading side core for applying a recording magnetic field to a recording medium. In the read head h1, the lower core layer 20 functions as an upper shield layer. In the read head h1, a gap length (read width) G11 is determined depending on the gap between the lower shield layer 1 and the lower core layer 20.

A gap layer (non-magnetic material layer) 8 made, for example, of aluminium oxide and an insulating layer (not shown) formed of a polyimide or resist material are built up on the lower core layer 20, and a coil layer 9 formed in a coil-shaped pattern is formed on the insulating layer. The coil layer 9 is formed of a non-magnetic conductive material having a small electric resistance, such as Cu (copper). The coil layer is surrounded with an insulating layer (not shown) formed of a polyimide or resist material, and an upper core layer 10 formed of a magnetic material, such as permalloy, is formed on the insulating layer by plating. It will be noted that the upper core layer 10 function as a trailing side core of the inductive head h2 capable of applying a recording magnetic field to a recording medium.

The upper core layer 10 is in face-to-face relation with the lower core layer 20 via the gap layer 8 at facing side of the recording medium as shown, thereby forming a magnetic gap with a magnetic gap length G12, from which a recording magnetic field is applied to a recording medium. Moreover, a protective layer 11 made of aluminium oxide is formed on the upper core layer 10.

In the inductive head h2, an electric current for recording is applied to the coil layer 9, and a magnetic field for recording is applied to the upper core layer 10 and the lower core layer 20 from the coil layer 9. The leakage magnetic field between the lower core layer 20 and the upper core layer 10 at the magnetic gap portion enables one to record magnetic signals in a recording medium such as a hard disk.

With the thin film magnetic head shown in FIG. 3, the lower core layer 20 functions not only as a leading side core of the inductive heat h2, but also as an upper shield layer of the read head h1, so that the lower core layer 20 should have natures as both a core and a shield.

In order to enhance the core function of the lower core layer 20, the read density of signals in a recording medium has to be increased, for which the layer 20 should have a high saturation magnetic flux density.

Moreover, the layer 20 should preferably have a high resistivity. If the resistivity is low, a heat loss caused by an eddy current in a high frequency band increases, thereby presenting the problem that the magnetic field for recording undergoes a non-linear transition shift (NLTS) due to the eddy current loss, thereby degrading recording characteristics.

In order to enhance the shield function of the lower core portion, it is necessary to stabilize a magnetic domain at the lower core layer 20. To this end, the lower core layer 20 should have properties including an appropriate anisotropic magnetic field and a low magnetostriction constant.

In this connection, however, permalloy, which is used to form a conventional lower core layer 20, has a relatively high saturation magnetic flux density (Bs) of about 10 kG (killogausses), but its resistivity (ρ) is as low as about 30 $\mu\Omega\cdot$cm along with an anisotropic magnetic field (Hk) being as low as about 30 Oe (oersteds).

In this way, the lower core layer 20 formed of permalloy has such a low resistivity that it could not stand use in high frequency recording. In addition, since the anisotropic magnetic field is so low as mentioned above, the magnetic domain in the lower core layer 20 becomes unstabilized, with the result that the magnetic domain in the MR layer is unstabilized, leading to the problem that bark hausen noises are liable to occur.

SUMMARY OF THE INVENTION

An object of the invention is to provide a soft magnetic film which overcomes the problems involved in the prior art and which has high saturation magnetic flux density and high resistivity.

Another object of the invention is to provide an MR/inductive composite-type thin film magnetic head which makes use of the abovementioned soft magnetic film as a lower core film to improve both core and shield functions thereof.

The soft magnetic film according to the invention comprises a major proportion of Co and minor proportions of at least one element T selected from Fe, Ni, Mn and Pd, at least one element M selected from Ti, Zr, Hf, V, Nb, Ta, Mo and W, and C wherein the film is mainly composed of an amorphous phase structure, and the at least one element M and C selectively undergoes chemical bonding.

In the practice of the invention, the soft magnetic film has the following compositional formula $$Co_xT_yM_zC_v$$

wherein T represents one or more of elements selected from Fe, Ni, Mn and Pd, and M represents one or more of elements selected from Ti, Zr, Hf, V, Nb, Ta, Mo and W, and compositional ratios by atomic % of x, y, z and v satisfy the following relationships that $70 \leq x \leq 96$, $0 \leq y \leq 5$ when element T consists of Fe, $0 \leq v \leq 20$ when element T consists of Ni, $0 \leq y \leq 15$ when element T consists of Mn, $0 \leq y \leq 10$ when element T consists of Pd $1 \leq z \leq 7$, and $3 \leq v \leq 1\ 5$.

Alternatively, the film may have the following compositional formula $$Co_xT_yM_xC_vX_wZ_s$$

wherein T represents one or more of elements selected from Fe, Ni, Mn and Pd, M represents one or more of elements selected from Ti, Zr, Hf, V, Nb, Ta, Mo and W, X represents one or more of elements selected from B, N, Si, P, S and Ge and Z represents one or more of elements selected from Al, Ru, Rh, Ag, Re, Os, Ir, Pt and Au, and compositional ratios by atomic % of x, y, z, v, w and s satisfy the following relationships that $70 \leq x \leq 96$, $0 \leq y \leq 5$ when element T consists of Fe, $0 \leq y \leq 20$ when element T consists of Ni, $0 \leq y \leq 15$ when element T consists of Mn, $0 \leq y \leq 10$ when element T consists of Pd $1 \leq z \leq 7$, $3 \leq v \leq 15$, $0 \leq w \leq 10$, and $0 \leq s 10$ In the present invention, not less than 20 atomic % of element M in the soft magnetic film should preferably be chemically bonded or combined with C. It will be noted that the chemical bonding can be analyzed according to the X-ray photoelectron spectroscopy (XPS), or the election energy-loss spectroscopy (EELS).

Moreover, the soft magnetic film should preferably have an amorphous phase film structure in whole.

It will be noted that in order that the whole film structure of the soft magnetic film is made of an amorphous phase, it is essential that the soft magnetic be not subjected to annealing treatment after film formation.

In the practice of the invention, the soft magnetic film may have such a film structure that a fine crystalline phase co-exists in the amorphous phase in small amounts.

In this case, the amorphous phase should preferably be not less than 50% in the whole film structure on the volume basis. More preferably, the amorphous phase should preferably be not less than 80% in the whole film structure on the volume basis.

Further, the average size of crystal particles in the fine crystalline phase should preferably be 10 nm or below.

In order to permit a fine crystalline phase to co-exist in the amorphous phase, it is sufficient to anneal a soft magnetic film after its film formation. However, if the annealing temperature is too high, most of the film structure is formed of the fine crystalline phase, so that the resistivity of the soft magnetic film lowers. In this sense, the annealing temperature is preferably 300° C. or below.

The magnetic characteristics of the soft magnetic film of the invention include a saturation magnetic flux density (Bs) of 13 KG or over, a resistivity ($\rho$) of 100 $\mu\Omega\cdot$cm or over, a magnetostriction constant ($\lambda$s) of $1.5 \times 10^{-6}$ or below in terms of absolute value, and an anisotropic magnetic field (Hk) ranging from 10 to 20 Oe (oersteds).

According to another embodiment of the invention, there is also provided an MR/inductive composite-type magnetic head which comprises a magnetoresistive layer, an electrode layer capable of passing a detection current to the magnetoresistive layer, a lower core layer formed on the electrode layer via an insulating layer and having an upper shield function for a read head, an upper core layer arranged in face-to-face relation with the lower core layer via a magnetic gap at a portion facing to a recording medium, wherein the lower core layer is formed of the above-defined soft magnetic film.

As stated hereinbefore, permalloy, which has been conventionally employed as a core material for soft magnetic head, exhibits a high saturation magnetic flux density, but with the problem that its resistivity and anisotropic magnetic field are, respectively, small.

Soft magnetic films composed mainly of Co, like the invention, are known including Co—T—M alloys wherein T=at least one of Fe, Ni, Mn and Pd, and M=at least one of Ti, Zr, Hf, V, Nb, Ta, Mo and W. This type of soft magnetic film has the problem that its saturation magnetic flux density (Bs) is low.

The reason why the saturation magnetic flux density (Bs) of the Co—T—M alloy becomes low is that the element M existing in close proximity to Co lowers the magnetic moment and the Curie temperature of Co.

In U.S. Pat. Nos. 5,164,025 and 5,031,063, soft magnetic films having such a compositional formula of Co—T—M—C as in the present invention are disclosed. The soft magnetic film is subjected to annealing at high temperatures (550° C. or higher) after film formation, so that most of the film structure is converted to a crystalline phase. In view of this, it is assumed that the resistivity ($\rho$) of the soft magnetic film set out in these publications becomes very small, thereby presenting the problems on the eddy current loss and the non-linear transition shift of a magnetic field for recording in a high-frequency band.

Under these circumstances, we have developed a soft magnetic film which has high saturation magnetic flux (Bs) and resistivity ($\rho$) and which has good magnetic characteristics such as a low magnetostriction constant ($\lambda$s) and an appropriate anisotropic magnetic field (Hk).

The soft magnetic film of the invention is described in detail.

The compositional formula of the soft magnetic film according to the invention is represented by $Co_xT_yM_zC_v$, wherein element T is at least one member selected from Fe, Ni, Mn and Pd, and element M is at least one member selected from Ti, Zr, Hf, V, Nb, Ta, Mo and W, and the compositional ratios of x, y, z and v are by atomic %.

In the soft magnetic film, Co and element T are, respectively, a main component, among which Co, and Fe and Ni used as element T are all ferromagnetic in nature. Accordingly, these Co, Ni and Fe are elements which assume the responsibility of magnetism. Moreover, Co serves to increase uniaxial magnetic anisotropy.

The compositional ratio (atomic %), x, of Co should preferably be in the range of $70 \leq x \leq 96$. If the compositional ratio, x, is less than 70 atomic %, the saturation magnetic flux density (Bs) unfavorably lowers. The concentration of element M described hereinafter should be in the range of 1 atomic % or over at the lowest, and the concentration of C should be in the range of 3 atomic % at the lowest. In view of this, the upper limit of the Co concentration is determined at 96 atomic %.

The addition of element T (i.e. one or more of elements selected from Fe, Ni, Mn and Pd) results in the lowering of magnetostriction constant ($\lambda s$).

If element T is not added to, the magnetostriction constant of the soft magnetic film of the invention is in the order of magnitude of $10^{-6}$ with a negative sign. However, in order to stabilize magnetic domains in the soft magnetic film, it is preferred to make the magnetostriction constant at a level as close as zero. The addition of the element T enables one to make the magnetostriction constant closer to zero.

Among elements T, Fe is more reliable in order to cause the magnetostriction constant to come close to zero, and makes it possible to increase both saturation magnetic flux density and anisotropic magnetic field.

Preferably, the compositional ratio, x (atomic %), of element T is $0 \leq x \leq 5$ when element T consists of Fe, $0 \leq x \leq 20$ when element T consists of Ni, $0 \leq x \leq 15$ when element T consists of Mn, and $0 \leq x \leq 10$ when element T consists of Pd.

The magnetostriction constant of the soft magnetic film changes depending on the type and amount of element M and the annealing temperature as will be discussed hereinafter, and should be appropriately controlled while taking actual use conditions into consideration.

Element M (i.e. at least one of Ti, Zr, Hf, V, Nb, Ta, Mo and W) contributes to the formation of an amorphous phase, and at least a part of element M is chemically bonded with C. In the practice of the invention, it is preferred that element M is chemically bonded with C in amounts of not less than 20%. A larger amount of element M being chemically bonded with C results in a higher resistivity and a more reduced eddy current loss in the high-frequency band.

The compositional ratio, y (atomic %), of element M should preferably such that $1 \leq y \leq 7$.

If the compositional ratio, y, is less than 1 atomic %, an amorphous phase may not be formed. Accordingly, the compositional ratio, y, should preferably be 1 atomic % or over. On the contrary, when the compositional ratio is larger than 7 atomic %, the saturation magnetic flux density may lower. In this sense, the compositional ratio, y, should preferably be 7 atomic % or below.

Among elements M, Zr and Hf are, respectively, able to stably form an amorphous phase when used at a low concentration. The use of Zr and/or Hf as element M makes it possible to obtain a high saturation magnetic flux density at a low concentration thereof. When using Zr and/or Hf, a more preferably compositional ratio, y, is in the range of $1 \leq y \leq 4$.

C contributes to the formation of an amorphous phase, and is an element which is necessary for obtaining high resistivity.

If C is not added to, element M exists in the proximity of Co, so that the magnetic moment and the Curie temperature based on Co lowers, with a smaller saturation magnetic flux density.

Thus, according to the invention, C should be added to so as to permit selective chemical bonding between element M and C. In doing so, the probability of element M coming close to Co lowers, ensuring a high saturation magnetic flux density.

The compositional ratio, z (atomic %), of C should preferably be in the range of $3 \leq z \leq 15$.

If the compositional ratio, z, of C is less than 3 atomic %, an amorphous phase may not be formed. The compositional ratio, z, should preferably be 3 atomic ratio or over. On the contrary, when the compositional ratio is larger than 15 atomic %, the saturation magnetic flux density may lower. The compositional ratio should preferably be 15 atomic % or below.

In the practice of the invention, one or more elements X selected from B, N, Si, P, S and Ge, and one or more elements Z selected from Al, Ru, Rh, Ag, Re, Os, Ir, Pt and Au may also be added to the soft magnetic film.

The addition of element X can further increase resistivity, and element X plays a supplemental role in the formation of an amorphous phase.

The compositional ratio, w (atomic %), of element X should preferably be in the range of $0 \leq w \leq 10$. When the compositional ratio, w, exceeds 10 atomic %, the saturation magnetic flux density may lower.

The addition of element Z contributes to the improvement of corrosion resistance.

The compositional ratio, s (atomic %), of element Z should preferably be in the range of $0 \leq s \leq 10$. If the compositional ratio exceeds 10 atomic %, the saturation magnetic flux density may lower.

As described hereinabove, the film structure of the soft magnetic film of the invention may be wholly made of an amorphous phase, or may be composed of a major proportion of an amorphous phase, with a minor portion of a fine crystalline phase being contained.

For the formation of the film structure which is wholly made of an amorphous phase, it is preferred that an annealing treatment is not performed after the formation of a soft magnetic film. The film structure whose entirety is made of an amorphous phase exhibits a very high resistivity.

Where a fine crystalline phase is partly contained, the ratio by volume of the amorphous phase in the film structure should be at least 50% or over, preferably 80% or over.

The fine crystalline phase is constituted of fine crystals of Co and fine crystals of carbide of element M.

In order to permit an amorphous phase and a fine crystalline phase to co-exist, a soft magnetic film is formed, and is subsequently annealed. In this connection, however, if the annealing temperature is at 300° C. or higher, there is the possibility that the fine crystalline phase is formed in large amounts. Accordingly, the annealing temperature should preferably be 300° C. or below.

If an amorphous phase and a fine crystalline phase co-exist, the resistivity of the resultant film lowers, but there is obtained a saturation magnetic flux density higher than that of a film made entirely of an amorphous phase. However, if the fine crystalline phase occupies not less than 50% (by volume) of the film, the resistivity undesirably lowers to a level less than 100 $\mu\Omega \cdot cm$.

The average size of the fine crystals in the fine crystalline phase should preferably be in the range of not larger than 10 nm in order to obtain good magnetic characteristics.

The soft magnetic film formed in this way is applicable to as a lower core layer of an MR/inductive composite-type thin film magnetic head. The lower core head of the thin film magnetic head functions as a leading side core layer and also as a shield layer which protects an MR layer from additional signals from outside.

In order to enhance, especially, the core function, characteristic properties, such as a high saturation magnetic flux density and a high resistivity, are necessary. On the other hand, in order to enhance the shield function, a lower magnetostriction constant and an appropriate anisotropic magnetic field are necessary.

The soft magnetic film of the invention has, as is particularly shown in Tables 1 and 2 (appearing in Examples), a saturation magnetic flux density of 13 kG or over, a magnetostriction constant of $1.5 \times 1^{-6}$ or below in absolute value, and an anisotropic magnetic field of 10 to 20 Oe, and a resistivity which is very high at 100 $\mu\Omega \cdot cm$ on comparison with that of existing permalloy (i.e. Ni—Fe alloy).

When the soft magnetic film of the invention is employed as a lower core layer, such a lower core layer can be enhanced in its core and shield functions. Especially, since resistivity is high, a heat loss caused by an eddy current can be reduced in a high-frequency band, and a non-linear transition shift (NLTS) also caused by the eddy current can be appropriately suppressed.

DESCRIPTION OF THE PREFERRED EMBODIMENTS

Figure 1:
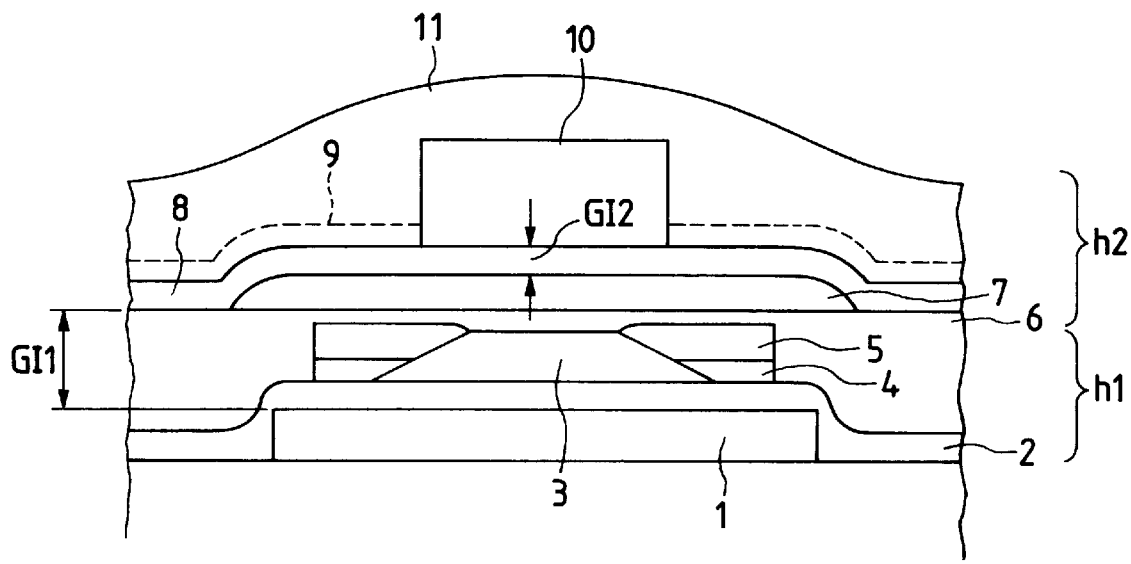
FIG. 1 is an enlarged sectional view of an MR/inductive composite-type thin film magnetic film showing a structural arrangement according to an embodiment of the invention.
Figure 2:
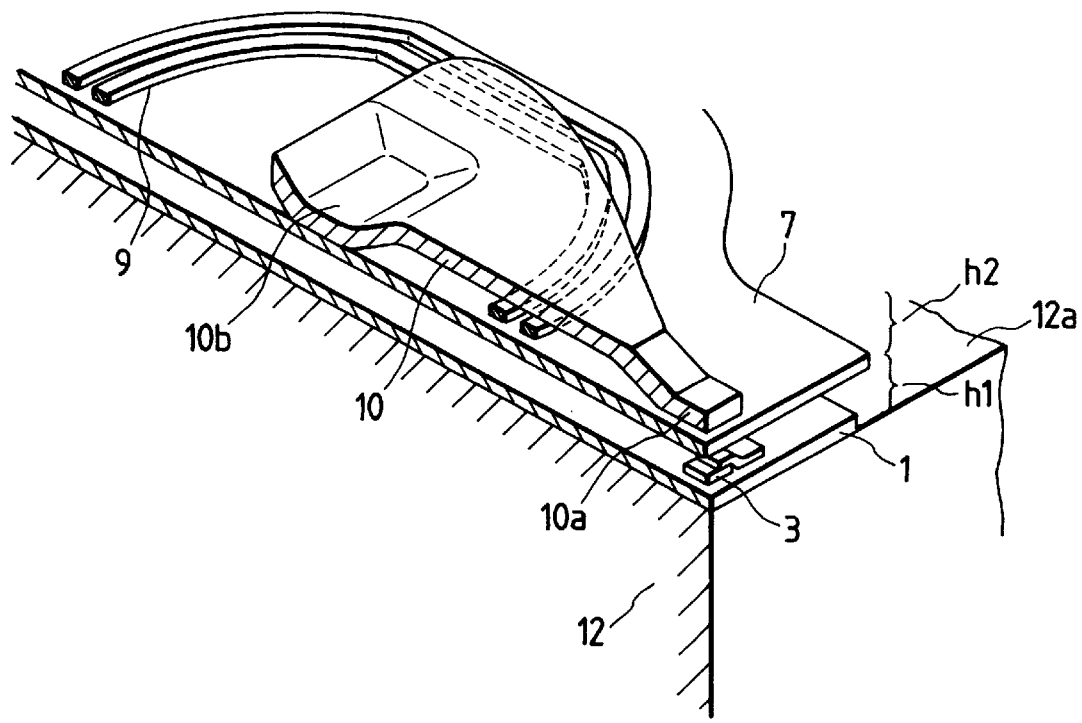
FIG. 2 is a perspective view, partially in section, showing a shape of a thin film magnetic head formed on a slider.
Figure 3:
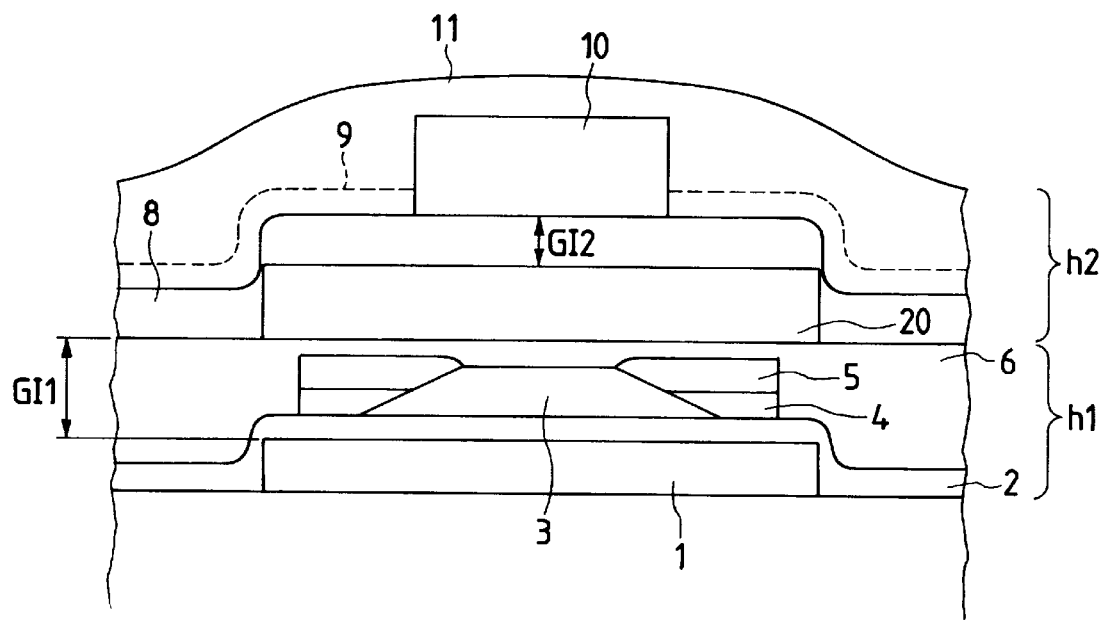
FIG. 3 is an enlarged sectional view showing a conventional thin film magnetic head.

FIG. 1 is an enlarged sectional view showing a thin film magnetic head according to an embodiment of the invention as viewed from a facing side of a recording medium. FIG. 2 is a schematic perspective view showing an entire structural arrangement of the thin film magnetic head of the invention formed on a slider 12.

The thin film magnetic head shown in FIGS. 1 and 2 is formed on an end face at a trailing side of a slider 12 constituting a floating head, in which a read head h1 and a recording inductive head h2 are built up to provide an MR/inductive composite-type thin film magnetic head (hereinafter referred to simply as "thin film magnetic head").

The read head h1 utilizes an magnetoresistive effect to detect a leakage magnetic filed from a recording medium such as a hard disk, and reads out recording signals. As shown in FIG. 2, a lower shield layer 1 made of a soft magnetic material is formed at an end face 12a at a trailing side of a slider 12. The lower shield layer 1 is formed of sendust or an Ni—Fe alloy (permalloy).

A lower gap 2, which is formed of a non-magnetic material such as $Al_2O_3$ (aluminium oxide), is formed on the lower shield layer 1. A magnetoresistive layer 3 is formed on the lower gap layer 2. The magnetoresistive layer 3 has a three-layered structure including, from the bottom, a SAL layer made of a soft magnetic material (e.g. a Co—Zr—Mo alloy or an Ni—Fe—Nb alloy), a shunt made of a non-magnetic materials (e.g. Ta (tantalum), and an MR layer (made, for example, of an Fe—Ni alloy) having a magnetoresistive effect. A hard bias layer 4 capable of yielding a bias magnetic field to the MR layer and an electrode layer 5 (W (tungsten) or Cu (copper)) capable of yielding a detection current to the MR layer are, respectively, formed at opposite sides of the magnetoresistive layer 3. An upper gap layer 6 made, for example, of aluminium oxide, is further formed as shown. In the read head h1, a gap length G11 is determined depending on the gap between the lower shield layer 1 and a lower core layer (upper shield layer) described hereinafter. In order to enhance a resolution for a leakage magnetic field from a recording medium, it is preferred to form the lower gap layer 2 and the upper gap layer 6 as thinly as possible.

A lower core layer 7 made of a soft magnetic material, which serves as a leading side core of an inductive head h2, is formed on the upper gap layer 6. This lower core layer 7 serves also as an upper shield layer of the read head h1. A gap layer (a non-magnetic material layer) made, for example, of aluminium oxide is formed on the lower core layer 7, over which a coil layer 9 is formed, in a coil-shaped pattern as viewed in a plane, via an insulating layer (not shown) made of a polyimide or resist material. The coil layer 9 is formed of a non-magnetic conductive material with a small electrode resistance, e.g. Cu (copper).

The coil layer 9 is surrounded with the insulating layer (not shown) formed of a polyimide or resist material, and an upper core layer 10 made of a soft magnetic material and serving as a trailing side core of the inductive head h2 is formed on the insulating layer. As is particularly shown in FIG. 1, the upper core layer 10 is, at its tip portion 10, in face-to-face relation with the lower core layer via the non-magnetic material layer 8, thereby forming a magnetic gap having a magnetic gap length G12 to impart a recording magnetic field to a recording medium. The upper core layer 10 has a base end portion 10b which is magnetically connected to the lower core layer 7 as shown in FIG. 2. A protective layer 11 made, for example, of aluminium oxide is formed over the upper core layer 10.

In the inductive head h2, a recording current is applied to the coil layer 9, under which a recording magnetic field is induced from the coil layer 9 to the lower core layer 7 and the upper core layer 10. Eventually, magnetic signals are recorded in a recording medium, such as a hard disk, at a portion of the magnetic gap length G12 according to a leakage magnetic field established between the lower core layer and the tip portion 10a of the upper core layer 10.

In order to have magnetic signals recorded in a recording medium, such as a hard disk, at high density in the inductive head h2, the gap length G12 in the inductive head h2 should be formed as short as possible.

The lower core layer 7, which has both a function as a leading side core of the inductive head h2 and a function as an upper shield of the read head h1, should be formed of a soft magnetic material having high saturation magnetic flux density, high resistivity, low magnetostriction constant and appropriate anisotropic magnetic field.

In the practice of the invention, the lower core layer 7 is formed of such a Co—T—M—C alloy as defined hereinbefore.

The structure of the soft magnetic film is predominantly composed of an amorphous phase, with a fine crystalline phase being completely free or being small in amounts, if present. Accordingly, the soft magnetic film has a high resistivity ($\rho$). More particularly, a resistivity of 100 $\mu\Omega \cdot cm$ or over may be realized.

Element M (made of one or more elements selected from Ti, Zr, Hf, V, Nb, Ta and W) is chemically bonded with C, so that element M is unlikely to lower the magnetic moment and the Curie temperature inherent to Co, but with a high saturation magnetic flux density (Bs). In particular, one is enabled to obtain a saturation magnetic flux density which is 13 kG (killogausses) or over.

Although the magnetostriction constant ($\lambda s$) varies depending on the annealing temperature, the addition of element T (made of one or more elements selected from Fe, Ni, Mn and Pd) ensures a magnetostriction constant ($\lambda s$) which is in the range of $1.5 \times 10^{-6}$ or below. If Fe is selected among elements T, it is possible to further lower the magnetostriction constant.

Using the soft magnetic film of the invention, an anisotropic magnetic field (Hk) of 10 to 20 Oe (oersteds) can be obtained.

The soft magnetic film used as the lower core layer 7 and described in detail above can be formed according to any known techniques including a sputtering method and an evaporation method. The sputtering method useful for this purpose includes RF conventional sputtering, DC sputtering, magnetron sputtering, triode sputtering, ion beam sputtering, facing target sputtering, and the like.

In the practice of the invention, the soft magnetic film may not be annealed after its formation, or may be annealed at temperatures of 300° C. or below.

When any annealing treatment is not effected, the resultant soft magnetic film can be formed as an amorphous phase in its entire film structure. Alternatively, when an annealing treatment at 300° C. or below is carried out, the film structure can be predominantly formed of an amorphous phase, with a minor proportion of a fine crystalline phase co-existing.

It will be noted that when the annealing temperature exceeds 300° C., too much a fine crystalline phase is in co-existence, thus being disadvantageous in that the resistivity lowers and a magnetic domain structure of the MR layer is adversely influenced.

As shown in FIG. 1, the lower core layer 7 formed according to a sputtering method or an evaporation method is formed in a thickness smaller than the lower core layer 20 formed according to a conventional plating method. This makes it possible to form the gap layer on the lower core layer 7 in a uniform thickness.

The lower core layer used in the present invention has high saturation magnetic flux density along with high resistivity, so that an eddy current is unlikely to occur in a high frequency band and the non-linear transition shift (NLTS) caused by the eddy current loss is suppressed. Moreover, the lower core layer 7 has a low magnetostriction constant and an appropriate anisotropic magnetic field, thus leading to the stabilization of magnetic domains and the improvement of a shield function.

EXAMPLE

Using an RF conventional sputtering apparatus, a composite target composed of a Co target and pellets of elements M, T and C arranged around the Co target was subjected to sputtering in magnetic field in an atmosphere of Ar gap under the following sputtering conditions.

Ar gas pressure: 5 mTorr.

Magnetic field: 50 (Oe)

Substrate: glass substrate (indirect cooling)

After formation of films, several samples were thermally treated, and all samples were subjected to measurements of saturation magnetic flux density (Bs), resistivity ($\rho$), saturation mangetostriction constant ($\lambda s$) and anisotropic magnetic field (Hk).

Referring to Table 1, the example is further illustrated.

TABLE 1

| | Film Composition (atomic %) | Thermal Treatment | Film Structure | Saturation Magnetic Flux Density(Bs) | Resistivity ($\rho$) | Saturation Magneto-striction Constant ($\lambda s$) | Anisotropic Magnetic Field (Hk) |
|---|---|---|---|---|---|---|---|
| Inventive Samples | 1: $Co_{87.6}Fe_{3.2}Hf_{2.5}C_{6.7}$ | after film formation (before thermal treatment) | amorphous | 13.5 kG | 118 | $+1.3 \times 10^{-6}$ | 20 Oe |
| | 2: $Co_{87.6}Fe_{3.2}Hf_{2.5}C_{6.7}$ | after thermal treatment under conditions of 300° C. × 60 minutes(in a magnetic field of 2 kOe) | amorphous phase (+ small amount of fine crystalline particles with a size of 5 nm or below) | 15.0 kG | 100 | $+0.4 \times 10^{-6}$ | 19 Oe |
| Samples of Prior Art | 3: $Co_{87.6}Fe_{3.2}Hf_{2.5}C_{6.7}$ | after thermal treatment under conditions of 550° C. × 20 minutes | fine crystals | 16.8 kG | 41 | $-1.5 \times 10^{-6}$ | 17 Oe |
| | 4: $Co_{88.6}Nb_{7.0}Zr_{4.4}$ | after film formation (before thermal treatment) | amorphous | 12.4 kG | 105 | $+0.3 \times 10^{-6}$ | 13 Oe |
| | 5: $Ni_{82}Fe_{18}$ | after film formation (before thermal treatment) | crystals | 10 kG | 30 | $-0.7 \times 10^{-6}$ | 3 Oe |

As shown in Table 1, two types of alloy films having a composition of $Co_{87.6}Fe_{3.2}Hf2_{.5}C_{6.7}$ were made including sample 1 wherein no thermal treatment was effected after film formation, and sample 2 wherein after film formation, a thermal treatment was effected at a temperature of 300° C. for 60 minutes while applying thereto a magnetic field at 2 kOe.

There were also sample 3 wherein an alloy, having a composition of $CO_{87.6}Fe_{3.2}Hf_{2.5}C_{5.7}$ was formed as a film, after which thermal treatment was effected at a temperature of 550° C. for 20 minutes.

Further, there were also made sample 4 wherein a Co—M alloy, i.e. $Co_{88.6}Nb_{7.0}Zr_{4.4}$, was formed as a film, after which no thermal treatment was effected, and sample 5 consisting of $Ni_{82}Fe_{18}$ (permalloy) (not thermally treated).

The film structures of the respective soft magnetic films were analyzed through the X-ray photoelectron spectroscopy (XPS), or the electron energy-loss spectroscopy (EELS). The results of the analysis are shown in "Film Structure" in Table 1.

As shown in the column "Film Structure" in Table 1, samples 1 and 4 were found to be amorphous in phase. With the case of sample 1, it was found through the analysis of the X-ray photoelectron spectroscopy (XPS) that Hf and C were chemically bonded.

Sample 2 contained a small amount of a fine crystalline phase (fine crystals of Co and/or fine crystals of Hf carbide with a size of 5 nm or below) in the amorphous phase. It was found that sample 3 was wholly composed of a fine crystalline phase, and sample 5 was made of a crystalline phase with a large particle size.

Then, the soft magnetic films of samples 1 to 5 were each subjected to measurements of saturation magnetic flux density (Bs), resistivity (ρ), saturation magnetostriction constant (λs) and anisotropic magnetic field (Hk), with the results shown also in Table 1.

The comparison between the results of samples 1 and 2 reveals that sample 2 undergoing the thermal treatment is higher in the saturation magnetic flux density (Bs). Nevertheless, the resistivity (ρ) is lower in sample 2 than in sample 1.

With regard to comparative sample 3, the saturation magnetic flux density is higher than those of inventive samples 1 and 2, but the resistivity is smaller and is at 100 μΩ·cm or below.

The reason why the resistivity of sample 3 is lower is that the sample was subjected to the thermal treatment at a temperature as high as 550° C., and the film structure is wholly converted to a fine crystalline phase.

With respect to comparative sample 4, it will be seen that the saturation magnetic flux density is lower than those of inventive samples 1 and 2.

Presumably, this is because Nb and Zr co-exist in the proximity with Co, and the magnetic moment and the Curie temperature of Co lower.

On the other hand, with samples 1 and 2 of the invention, since Hf and C are chemically bonded, a ratio of Hf atoms co-existing in the proximity of Co is so small that the magnetic moment and the Curie temperature of Co do not lower, permitting the saturation magnetic flux density to be kept at a high level.

With regard to comparative sample 5, it will be seen that the resistivity and anisotropic magnetic field are much lower than those of inventive samples 1 and 2.

Then, five Co—T—M—C alloys (wherein their film structures were made of an amorphous phase with or without part of a fine crystalline phase therein) were formed as samples 6 to 10 of the invention shown in Table 2. The respective samples were subjected to measurements of saturation magnetic flux density (Bs), resistivity (ρ), saturation magnetostriction constant (λs) and anisotropic magnetic field (Hk).

TABLE 2

| | Film Composition (atomic %) | Thermal Treatment | Film Structure | Saturation Magnetic Flux Density(Bs) | Resistivity (ρ) | Saturation Magneto-striction Constant (λs) | Anisotropic Magnetic Field (Hk) |
|---|---|---|---|---|---|---|---|
| Inventive Samples | 6: $Co_{89.8}Hf_{2.2}C_{8.0}$ | after thermal treatment under conditions of 300° C. × 60 minutes (in a magnetic field of 2 kOe) | amorphous phase (+ small amount of fine crystalline particles with a size of 5 nm or below) | 14.9 kG | 104 | $-0.7 \times 10^{-6}$ | 12 Oe |
| | 7: $Co_{90.1}Zr_{2.8}C_{7.1}$ | after thermal treatment under conditions of 300° C. × 60 minutes (in a magnetic field of 2 kOe) | amorphous phase (+ small amount of fine crystalline particles with a size of 5 nm or below) | 13.9 kG | 110 | $-1.2 \times 10^{-6}$ | 14 Oe |
| | 8: $Co_{88.9}Fe_{2.0}Zr_{3.3}C_{5.8}$ | after thermal treatment under conditions of 300° C. × 60 minutes (in a magnetic field of 2 kOe) | amorphous | 14.0 kG | 102 | $+0.2 \times 10^{-6}$ | 18 Oe |
| | 9: $Co_{89.7}Fe_{2.0}Hf_{1.8}C_{4.2}Si_{2.3}$ | after film formation (before thermal treatment) | amorphous | 14.3 kG | 135 | $+0.3 \times 10^{-6}$ | 20 Oe |
| | 10: $Co_{88.1}Fe_{2.0}Hf_{1.7}C_{4.0}B_{4.2}$ | after thermal treatment under conditions of 300° C. × 60 minutes (in a magnetic field of 2 kOe) | amorphous phase (+ small amount of fine crystalline particles with a size of 5 nm or below) | 15.1 kG | 130 | $+0.2 \times 10^{-6}$ | 18 Oe |

Sample 6 shown in Table 6 is made of a Co—M—C alloy, and an alloy having a composition of $Co_{89.8}Hf_{2.2}C_{8.0}$ was formed as a film, followed by thermal treatment at a temperature of 300 C. for 60 minutes while applying a magnetic filed of 2 kOe thereto.

Sample 7 is made of a Co—M—C alloy, and an alloy having a composition of $Co_{90.1}Zr_{2.8}C_{7.1}$ was formed as a film, followed by thermal treatment at a temperature of 300 C. for 60 minutes while applying a magnetic filed of 2 kOe thereto.

Sample 8 is made of a Co—T—M—C alloy, and an alloy having a composition of $Co_{88.9}Fe_{2.0}Zr_{3.3}C_{5.8}$ was formed as a film, followed by thermal treatment at a temperature of 300 C. for 60 minutes while applying a magnetic filed of 2 kOe thereto.

Sample 9 is made of a Co—T—M—C—X alloy, and an alloy having a composition of $Co_{89.7}Fe_{2.0}Hf_{1.8}C_{4.2}Si_{2.3}$ was formed as a film, and was not thermally treated after the film formation.

Sample 10 is made of a Co—T—M—C—X alloy, and an alloy having a composition of $Co_{88.1}Fe_{2.0}Hf_{1.7}C_{4.0}B_{4.2}$ was formed as a film, followed by thermal treatment at a temperature of 300 C. for 60 minutes while applying a magnetic filed of 2 kOe thereto.

As shown in the column "Film Structure" in Table 2, samples other than samples 8 and 9 were found to contain, aside from an amorphous phase, a small amount of a fine crystalline phase.

It was found that in all the samples 6 to 10, Hf or Zr and C were chemically bonded. With samples 6, 7 and 10 wherein a fine crystalline phase was contained, it was found that the fine crystalline phase was constituted of fine crystals of Co and/or fine crystals of carbide of Hf (or Zr) and that the size of the fine crystals was 5 nm or below.

As shown in Table 2, the saturation magnetic flux densities (Bs) of the samples were all at high values of 13 kG (killogauses) or over.

The resistivity was the highest for sample 9 which underwent no thermal treatment. Moreover, samples 9 and 10 contained Si or B which acted to increase the resistivity. Accordingly, sample 10, which was thermally treated, was higher in the resistivity than samples 6,7 and 8 likewise subjected to the thermal treatment.

As for the magnetostriction constant (λs), it will be seen that samples 6, 7 are larger than samples 8, 9, 10. This is because samples 6, 7 are free of any element T which lowers the magnetostriction (whereas Fe is contained as element T in samples 8, 9 and 10). Especially, when Fe is added to as element T, like samples 8, 9, 10, the magnetostriction constant unlimitedly comes close to zero, and the anisotropic magnetic field (Hk) increases As will be described hereinbefore, a soft magnetic film, which comprises a major proportion of Co and minor proportions of at least one element T selected from Fe, Ni, Mn and Pd, at least one element M selected from Ti, Zr, Hf, V, Nb, Ta, Mo and W, and C wherein the film has a structure made predominantly of an amorphous phase and the at least one element M and C are chemically bonded, exhibits a high saturation magnetic flux density, a high resistivity, a low magnetostriction constant, and an appropriate anisotropic magnetic field.

In the practice of the invention, a fine crystalline phase may be co-exist with the amorphous phase. When the amorphous phase is contained in the range of not less than 50% by volume, preferably not less than 80% by volume, based on the film structure, the lowering of resistivity can be suppressed to a significant extent.

As stated before, since element M and C are chemically bonded, a ratio of the element M existing in the vicinity of Co lowers, ensuring high saturation magnetic flux density.

Element T serves to lower magnetostriction. Especially, when Fe is added, the magnetostriction constant can be unlimitedly brought to zero, along with increasing saturation magnetic flux density and anisotropic magnetic field.

If such a soft magnetic film is used as a lower core layer serving both as a core function and a shield function in an MR/inductive composite-type thin film magnetic head, the saturation magnetic flux density and resistivity of the lower core layer can be increased, thereby reducing the occurrence of an eddy current in a high frequency band to improve the core function.

Moreover, since the lower core layer is imparted with a low magnetostriction constant and an appropriate anisotropic magnetic field, the magnetic domains in the lower core layer can be stabilized, ensuring an improved shield function.

What is claimed is:

1. A soft magnetic film comprising a major proportion of Co, and minor proportions of at least one element M selected from Ti, Zr, Hf, V, Nb, Ta, Mo and W, and C wherein said film has a film structure mainly composed of an amorphous phase, and said at least one element M and C in the amorphous phase are selectively, chemically bonded.

2. A soft magnetic film according to claim 1, wherein said film has a composition of the following formula $$Co_xT_yM_zC_v$$

wherein T represents one or more of elements selected from Fe, Ni, Mn and Pd, and M represents one or more of elements selected from Ti, Zr, Hf, V, Nb, Ta, Mo and W, and compositional ratios by atomic % of x, y, z and v satisfy the following relationships that $70 \leq x \leq 96$, $0 \leq y \leq 5$ when element T consists of Fe, $0 \leq y 20$ when element T consists of Ni, $0 \leq y \leq 15$ when element T consists of Mn, $0 \leq y \leq 10$ when element T consists of Pd $1 \leq z \leq 7$, and $3 \leq v \leq 15$.

3. A soft magnetic film according to claim 1, wherein said film has a composition of the following formula $$Co_xT_yM_zC_vX_wZ_s$$

wherein T represents one or more of elements selected from Fe, Ni, Mn and Pd, M represents one or more of elements selected from Ti, Zr, Hf, V, Nb, Ta, Mo and W, X represents one or more of elements selected from B, N, Si, P, S and Ge and Z represents one or more of elements selected from Al, Ru, Rh, Ag, Re, Os, Ir, Pt and Au, and compositional ratios by atomic % of x, y, z, v, w and s satisfy the following relationships that $70 \leq x \leq 96$, $0 \leq y \leq 5$ when element T consists of Fe, $0 \leq y \leq 20$ when element T consists of Ni, $0 \leq y \leq 15$ when element T consists of Mn, $0 \leq y \leq 10$ when element T consists of Pd $1 \leq z \leq 7$, $3 \leq v \leq 15$, $0 \leq w \leq 10$, and $0 \leq s \leq 10$.

4. A soft magnetic film according to claim 1, wherein said at least one element M is chemically bonded with C in amounts of not less than 20% in the amorphous phase.

5. A soft magnetic film according to claim 1, wherein said soft magnetic film has a film structure composed entirely of an amorphous phase.

6. A soft magnetic film according to claim 1, wherein said soft magnetic film has a film structure which comprises a small amount of a fine crystalline phase in an amorphous phase.

7. A soft magnetic film according to claim 5, wherein said soft magnetic film is not annealed after formation of said film.

8. A soft magnetic film according to claim 1, wherein the film structure contains the amorphous phase at a volume ratio of not less than 80% to the entire structure.

9. A soft magnetic film according to claim 1, wherein the crystal grains of the fine crystalline phase have an average grain diameter of not greater than 10 nm.

10. A soft magnetic film according to claim 1, wherein said magnetic film is annealed at a temperature of not greater than 300° C. after deposition.

11. A soft magnetic film according to claim 1, wherein said soft magnetic film has a saturation magnetic flux density (Bs) of not less than 13 kG.

12. A soft magnetic film according to claim 1, wherein said soft magnetic film has a resistivity (ρ) of not less than 100 μΩ·cm.

13. A soft magnetic film according to claim 1, wherein said soft magnetic film has an absolute value of magnetostriction constant (λs) of not greater than $1.5 \times 10^{-6}$.

14. A soft magnetic film according to claim 1, wherein said soft magnetic film has an anisotropic magnetic field (Hk) of 10 to 20 Oe (Oersted).

15. An MR/inductive composite-type thin film magnetic head which comprises a magnetoresistive layer, an electrode layer formed adjacent to and capable of passing a detection current to said magnetoresistive layer, lower cord layer formed on said electrode layer via an insulating layer and having an upper shield function for a read head, an upper core layer arranged in face-to-face relation with said lower core layer via a magnetic gap at a portion facing to a recording medium, wherein said lower core layer is formed of a soft magnetic film which comprises a major proportion of Co, and minor proportions of at least one element M selected from Ti, Zr, Hf, V, Nb, Ta, Mo and W, and C wherein said film has a film structure mainly composed of an amorphous phase, and said at least one element M and C in the amorphous phase are selectively, chemically bonded.

16. An MR/inductive composite-type thin film magnetic head according to claim 15, wherein said soft magnetic film has a composition of the following formula $$Co_xT_yM_zC_v$$

wherein T represents one or more of elements selected from Fe, Ni, Mn and Pd, and M represents one or more of elements selected from Ti, Zr, Hf, V, Nb, Ta, Mo and W, and compositional ratios by atomic % of x, y, z and v satisfy the following relationships that 70 ≤ x ≤ 96, 0 ≤ y ≤ 5 when element T consists of Fe, 0 ≤ y ≤ 20 when element T consists of Ni, 0 ≤ y ≤ 15 when element T consists of Mn, 0 ≤ y ≤ 10 when element T consists of Pd 1 ≤ z ≤ 7, and 3 ≤ v ≤ 15.

17. An MR/inductive composite-type thin film magnetic head according to claim 15, wherein said soft magnetic film has a composition of the following formula $$Co_xT_yM_zC_vX_wZ_s$$

wherein T represents one or more of elements selected from Fe, Ni, Mn and Pd, M represents one or more of elements selected from Ti, Zr, Hf, V, Nb, Ta, Mo and W, X represents one or more of elements selected from B, N, Si, P, S and Ge and Z represents one or more of elements selected from Al, Ru, Rh, Ag, Re, Os, Ir, Pt and Au, and compositional ratios by atomic % of x, y, z, v, W and s satisfy the following relationships that 70 ≤ x ≤ 96, 0 ≤ y ≤ 5 when element T consists of Fe, 0 ≤ y ≤ 20 when element T consists of Ni, 0 ≤ y ≤ 15 when element T consists of Mn, 0 ≤ y ≤ 10 when element T consists of Pd 1 ≤ z ≤ 7, 3 ≤ v ≤ 15, 0 ≤ w ≤ 10, and 0 ≤ s ≤ 10.

18. An MR/inductive composite-type thin film magnetic head according to claim 15, wherein said at least one element M is chemically bonded with C in amounts of not less than 20% in the amorphous phase.

19. An MR/inductive composite-type thin film magnetic head according to claim 15, wherein said soft magnetic film has a film structure composed entirely of an amorphous phase.

20. An MR/inductive composite-type thin film magnetic head according to claim 15, wherein said soft magnetic film has a film structure which comprises a small amount of a fine crystalline phase in an amorphous phase.

21. An MR/inductive composite-type thin film magnetic head according to claim 15, wherein the film structure contains the amorphous phase at a volume ratio of not less than 80% to the entire structure.

22. An MR/inductive composite-type thin film magnetic head according to claim 15, wherein the crystal grains of the fine crystalline phase have an average grain diameter of not greater than 10 nm.

23. An MR/inductive composite-type thin film magnetic head according to claim 15, wherein said magnetic film is annealed at a temperature of not greater than 300° C. after deposition.

24. An MR/inductive composite-type thin film magnetic head according to claim 15, wherein said soft magnetic film has a saturation magnetic flux density (Bs) of not less than 13 kG.

25. An MR/inductive composite-type thin film magnetic head according to claim 15, wherein said soft magnetic film has a resistivity (ρ) of not less than 100 μΩ·cm.

26. An MR/inductive composite-type thin film magnetic head according to claim 15, wherein said soft magnetic film has an absolute value of magnetostriction constant (λs) of not greater than $1.5 \times 10^{-6}$.

27. An MR/inductive composite-type thin film magnetic head according to claim 15, wherein said soft magnetic film has an anisotropic magnetic field (Hk) of 10 to 20 Oe (Oersted).

28. An MR/inductive composite-type thin film magnetic head according to claim 19, wherein said soft magnetic film is unannealed.

* * * * *

UNITED STATES PATENT AND TRADEMARK OFFICE
CERTIFICATE OF CORRECTION

| | | |
|---|---|---|
| PATENT NO. | : 6,124,047 | Page 1 of 1 |
| DATED | : September 26, 2000 | |
| INVENTOR(S) | : Naoya Hasegawa | |

It is certified that error appears in the above-identified patent and that said Letters Patent is hereby corrected as shown below:

Column 14,
Line 4, change "$0 \leqq y20$" to -- $0 \leqq y \leqq 20$ --.
Line 10, change "composite-type thin" to -- composite thin --.

Column 15,
Lines 25 and 44, change "composite-type thin" to -- composite thin --.

Column 16,
Lines 12, 16, 20, 24, 29, 33, 37, 42, 45, 49 and 53, change "composite-type thin" to -- composite thin --.

Signed and Sealed this

Nineteenth Day of August, 2003

JAMES E. ROGAN
*Director of the United States Patent and Trademark Office*